F. VSETECKA.
DEPTH GAGE FOR CORN PLANTERS.
APPLICATION FILED FEB. 26, 1919.
1,305,324.
Patented June 3, 1919.
2 SHEETS—SHEET 1.
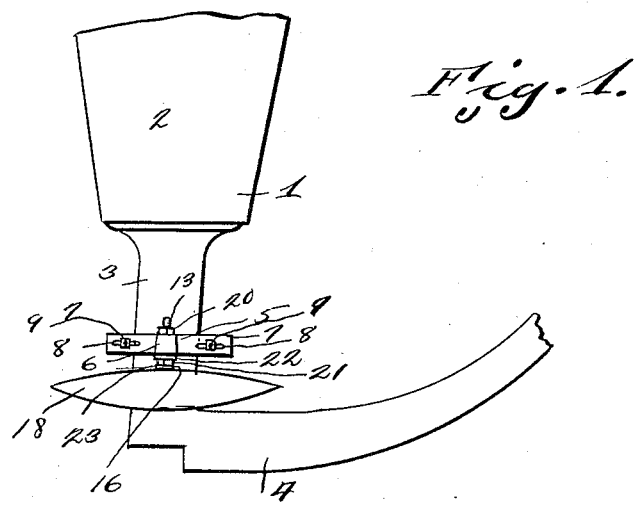
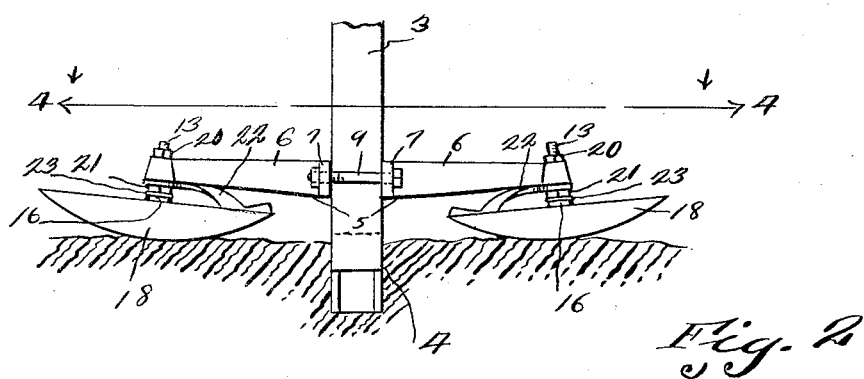
Inventor
F. Vsetecka
By D. Swift & C.
    ₥₷ Attorneys

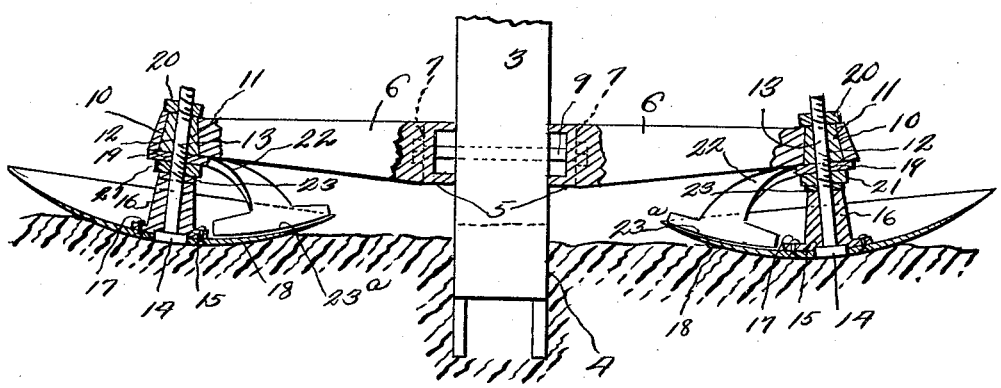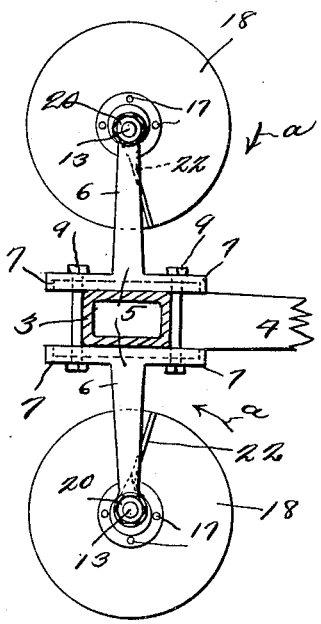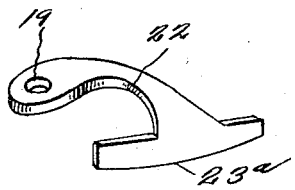

UNITED STATES PATENT OFFICE.

FRANK VSETECKA, OF FORT ATKINSON, IOWA.

DEPTH-GAGE FOR CORN-PLANTERS.

1,305,324.  Specification of Letters Patent.  Patented June 3, 1919.

Application filed February 26, 1919. Serial No. 279,339.

*To all whom it may concern:*

Be it known that I, FRANK VSETECKA, a citizen of the United States, residing at Fort Atkinson, in the county of Winneshiek, State of Iowa, have invented a new and useful Depth-Gage for Corn-Planters; and I do hereby declare the following to be a full, clear, and exact description of the invention, such as will enable others skilled in the art to which it appertains to make and use the same.

The invention relates to corn planters and has for its object to provide means where the depth of the furrow, formed by the runner of the planter is limited, also to provide a depth gage for planters wherein it will be possible to make the furrow of any desired depth.

A further object is to provide the upright portion of the runner with brackets, which are adjustable thereon vertically and to provide said brackets with disks adapted to contact with the ground so as to limit the depth of the furrow.

A further object is to mount the disks so that they will revolve and to provide means whereby any dirt that may gather in the disks will be scraped out of the same.

A further object is to mount the disks at an angle to the ground so that the tendency of the same will be to hill the dirt on either side of the furrow. Also by the use of the disks said disks will act as clod crushers and covering up means for the holes made by the horse's feet.

With the above and other objects in view, the invention consists of the arrangement and combination of parts shown in the drawings, described and claimed, it being understood that changes in the precise embodiment of the invention may be made within the scope of what is claimed without departing from the spirit of the invention.

In the drawings:—

Figure 1 is a side elevation of the lower part of a planter, showing the depth gage applied thereto.

Fig. 2 is a rear view of the runner, showing the gage disks in position thereon.

Fig. 3 is a view similar to Fig. 2, but showing the gage in section.

Fig. 4 is a horizontal sectional view taken on line 4—4 of Fig. 2.

Fig. 5 is a perspective view of the disk scraper.

Referring to the drawings the numeral 1 designates a conventional form of corn or seed planter, which is provided with a hopper 2 in which the seed to be planted are deposited. This hopper may be of any construction or form that is now on the market and in use. Depending downwardly from the hopper is the vertical arm 3 of the furrow runner 4, said runner 4 being of the usual construction and adapted to form a furrow in the ground, when the planter is moved forwardly over the ground. However as at present constructed there is no means whereby the depth of the furrow formed by the runner may be limited or gaged.

To gage the depth of the furrow and limit the depth of the same the gage 5 is provided. This gage is formed by means of the horizontal brackets 6, which are provided with arms 7, each of said arms having elongated apertures 8. Bolts 9 pass through the registering apertures 8, when the brackets are placed against the sides of the vertical portion 3 of the runner. These bolts when the brackets 6 are in proper positions are set up on and the brackets are then securely clamped to the upright portion 3.

The outer ends of the brackets 6 are provided with tapering apertures 10, in which are tapering bushings 11, said bushings being of soft metal will wedge in the apertures 10. The bushings 11 are provided with apertures 12, which receive the bolts 13, said bolts having cylindrical heads 14, which engage the cylindrical depressions 15 in the bosses 16, which are secured by means of rivets 17 to the disks 18. The bolt 13 also passes through the apertures 19 of the disk scrapers. Nuts 20 and 21 are provided and when set up clamp the scraper 22 securely against the end of the bracket, and also securely clamp the bushing 11 in the tapering aperture 10. However beneath the lower nuts there is placed washers 23, which engage the upper end of the bosses 16.

It will be seen that as the runner advances, that the disks will be caused to rotate, this rotation being caused by the fact that the disks are placed at an angle to the ground. However the scraper 22 will not rotate for the reason that it is securely clamped by the nuts 20 and 21. As the disks rotate the edge 23 of the scrapers will scrape the dirt that may gather in the concave portions of the disks and as it accumulates in front of the scrapers, it will be forced over the side of the disks on to the ground. It will also be seen that as the disks rotate in the direction of the arrows *a* that the tendency will be to hill the earth alongside of the furrow.

When it is desired to vary the depth of the furrow it will only be necessary to loosen the bolts 9 and move the brackets to the desired position.

As the planter is moved forwardly over the ground the convex surfaces of the disks will act as a clod crusher, they also will cover up the tracks left by the horse's feet.

The invention having been set forth, what is claimed as new and useful is:—

1. A depth gage for planter runners comprising brackets vertically adjustably secured to the runner, the outer ends of said brackets being provided with downwardly extending shafts, disks rotatably mounted on said shafts and adapted to engage the ground.

2. A depth gage for planter runners comprising brackets vertically adjustably secured to the runner, the outer ends of said brackets being provided with downwardly extending shafts, convex disks rotatably mounted on the shafts and held at an agle to the ground so that a greater area of the convex surfaces of the disks to the sides of the axis of the disks will engage the ground.

3. A depth gage for planter runners comprising brackets vertically adjustably secured to the runner, the outer ends of said brackets being provided with downwardly extending shafts, convex disks rotatably mounted on the shafts and held at an angle to the ground so that a greater area of the convex surfaces of the disks will engage the ground at the sides of the axis of the disks and scrapers engaging the concave surfaces of the disks.

In testimony whereof I have signed my name to this specification in the presence of two subscribing witnesses.

FRANK VSETECKA.

Witnesses:
ROBT. A. KLIMESH,
M. V. KINKOR.

Copies of this patent may be obtained for five cents each, by addressing the "Commissioner of Patents, Washington, D. C."